US008825609B2

(12) United States Patent
Duvvoori et al.

(10) Patent No.: US 8,825,609 B2
(45) Date of Patent: Sep. 2, 2014

(54) DETECTING WASTEFUL DATA COLLECTION

(75) Inventors: Vikram Duvvoori, Gilroy, CA (US); Satish Venkatesan Srinivasan, Chennai (IN); Prasad A Chodavarapu, Bangalore (IN); Ravindra S. Gajulapalli, Bangalore (IN); Rajesh Agrawal Ramesh, Chennai (IN)

(73) Assignee: HCL America, Inc., Sunnyvale, CA (US)

( * ) Notice: Subject to any disclaimer, the term of this patent is extended or adjusted under 35 U.S.C. 154(b) by 0 days.

(21) Appl. No.: 13/158,038

(22) Filed: Jun. 10, 2011

(65) Prior Publication Data

US 2012/0317081 A1 Dec. 13, 2012

(51) Int. Cl.
*G06F 17/30* (2006.01)
*G06Q 10/00* (2012.01)

(52) U.S. Cl.
CPC ..................... *G06Q 10/00* (2013.01)
USPC .......................... 707/690; 707/697

(58) Field of Classification Search
USPC ................................ 707/690, 694
See application file for complete search history.

(56) References Cited

U.S. PATENT DOCUMENTS

| | | | |
|---|---|---|---|
| 5,193,143 A | 3/1993 | Kaemmerer et al. | |
| 5,864,662 A | 1/1999 | Brownmiller et al. | |
| 6,072,777 A | 6/2000 | Bencheck et al. | |
| 6,369,836 B1 | 4/2002 | Larson et al. | |
| 6,415,259 B1 | 7/2002 | Wolfinger et al. | |
| 6,859,523 B1 | 2/2005 | Jilk et al. | |
| 6,985,872 B2 | 1/2006 | Benbassat et al. | |
| 7,028,228 B1 | 4/2006 | Lovy et al. | |
| 7,035,808 B1 | 4/2006 | Ford | |
| 7,761,320 B2 | 7/2010 | Fliess et al. | |
| 7,788,180 B2 | 8/2010 | Henderson et al. | |
| 8,214,240 B1 | 7/2012 | Morris et al. | |
| 8,296,170 B2 | 10/2012 | O'brien et al. | |
| 2001/0025247 A1 | 9/2001 | Nagai et al. | |
| 2002/0128810 A1 | 9/2002 | Craig et al. | |
| 2003/0028396 A1 | 2/2003 | Balasubramanian et al. | |
| 2004/0003132 A1 | 1/2004 | Stanley et al. | |
| 2005/0015668 A1 | 1/2005 | Doyle et al. | |
| 2005/0021383 A1 | 1/2005 | Fliess et al. | |

(Continued)

FOREIGN PATENT DOCUMENTS

WO   WO-2011/159984 A1   12/2011

OTHER PUBLICATIONS

"U.S. Appl. No. 12/819,020, Non Final Office Action mailed Apr. 9, 2012", 17 pgs.

(Continued)

*Primary Examiner* — Son T Hoang
(74) *Attorney, Agent, or Firm* — Schwegman Lundberg & Woessner, P.A.

(57) ABSTRACT

A method and system comprises a duplication identifier module to analyze data input information to automatically identify duplicate expected inputs associated with a process. The system includes logical process model information defining a logically structured series of process activities and data input information representing a plurality of expected inputs associated with respective process activities, with each expected input being indicative of expected collection of a corresponding data element during execution of the associated process activity. Each duplicate expected input comprises one of the plurality of expected inputs for which there is at least one other expected input with respect to a common corresponding data element.

14 Claims, 10 Drawing Sheets

(56) References Cited

U.S. PATENT DOCUMENTS

| | | |
|---|---|---|
| 2005/0251435 A1 | 11/2005 | Paolella et al. |
| 2006/0053262 A1 | 3/2006 | Prahlad et al. |
| 2006/0155562 A1 | 7/2006 | Kano et al. |
| 2006/0184401 A1 | 8/2006 | Delgaudio et al. |
| 2007/0061179 A1 | 3/2007 | Henderson et al. |
| 2008/0154828 A1* | 6/2008 | Antebi et al. .................. 706/46 |
| 2009/0210394 A1* | 8/2009 | Saravanan et al. ............... 707/3 |
| 2009/0228253 A1 | 9/2009 | Tolone et al. |
| 2009/0235037 A1 | 9/2009 | Mounier et al. |
| 2011/0208855 A1* | 8/2011 | Robertson et al. ........... 709/224 |
| 2011/0264768 A1* | 10/2011 | Walker et al. ................ 709/218 |
| 2011/0313812 A1 | 12/2011 | Duvvoori et al. |
| 2012/0116987 A1 | 5/2012 | Hering et al. |
| 2012/0216081 A1 | 8/2012 | Duvvoori et al. |
| 2012/0290543 A1 | 11/2012 | Duvvoori et al. |
| 2013/0024229 A1 | 1/2013 | Agrawal et al. |

OTHER PUBLICATIONS

"International Application Serial No. PCT/US2011/040830, International Search Report mailed Sep. 27, 2011", 2 pgs.

"International Application Serial No. PCT/US2011/040830, Written Opinion mailed Sep. 27, 2011", 5 pgs.

"U.S. Appl. No. 11/819,020, Final Office Action mailed Nov. 2, 2012", 25 pgs.

"U.S. Appl. No. 12/819,020, Response filed Aug. 9, 2012 to Non Final Office Action mailed Apr. 9, 2012", 16 pgs.

"U.S. Appl. No. 12/819,020, Response filed Mar. 4, 2013 to Final Office Action mailed Nov. 2, 2012", 11 pgs.

"U.S. Appl. No. 13/186,154, Final Office Action mailed May 16, 2013", 10 pgs.

"U.S. Appl. No. 13/186,154, Non Final Office Action mailed Sep. 25, 2012", 8 pgs.

"U.S. Appl. No. 13/186,154, Response filed Feb. 25, 2013 to Non Final Office Action mailed Sep. 25, 2012", 13 pgs.

"International Application Serial No. PCT/US2011/040830, International Preliminary Report on Patentability mailed Jan. 3, 2013", 7 pgs.

"U.S. Appl. No. 13/029,284, Non Final Office Action mailed Sep. 13, 2013", 16 pgs.

"U.S. Appl. No. 13/186,154, Response filed Nov. 18, 2013 to Final Office Action mailed May 16, 2013", 15 pgs.

* cited by examiner

DETECTING WASTEFUL DATA COLLECTION

TECHNICAL FIELD

The present application relates generally to the technical field of methods and systems for modeling, analyzing and managing processes. An example embodiment relates to methods and systems to perform computer-assisted process modeling.

BACKGROUND

Process modeling in systems engineering and software engineering relates generally to modeling or mapping a process or a number of processes in an enterprise. Such process modeling may facilitate analysis and improvement of the process (for example, serving to facilitate the analysis of a manufacturing process, a business process, or the like).

Process modeling may therefore be useful for process management. A process model may comprise structured information not only about the sequence and relationship of respective activities constituting a process or processes, but may also define relationships of process activities to other process elements or components, such as information technology (IT) systems, human resources, and the like. In certain embodiments, a business process model may therefore be part of a larger encompassing enterprise model. The latter may facilitate enterprise resource and/or business process analysis and management.

A process model may also be used to generate a graphical representation of process information. Visual modeling languages used to represent processes include Business Process Modeling Notation (BPMN) and the Event-driven Process Chain (EPC).

BRIEF DESCRIPTION OF THE DRAWINGS

Some embodiments are illustrated by way of example and not limitation in the figures of the accompanying drawings in which.

DETAILED DESCRIPTION

Figure 1:
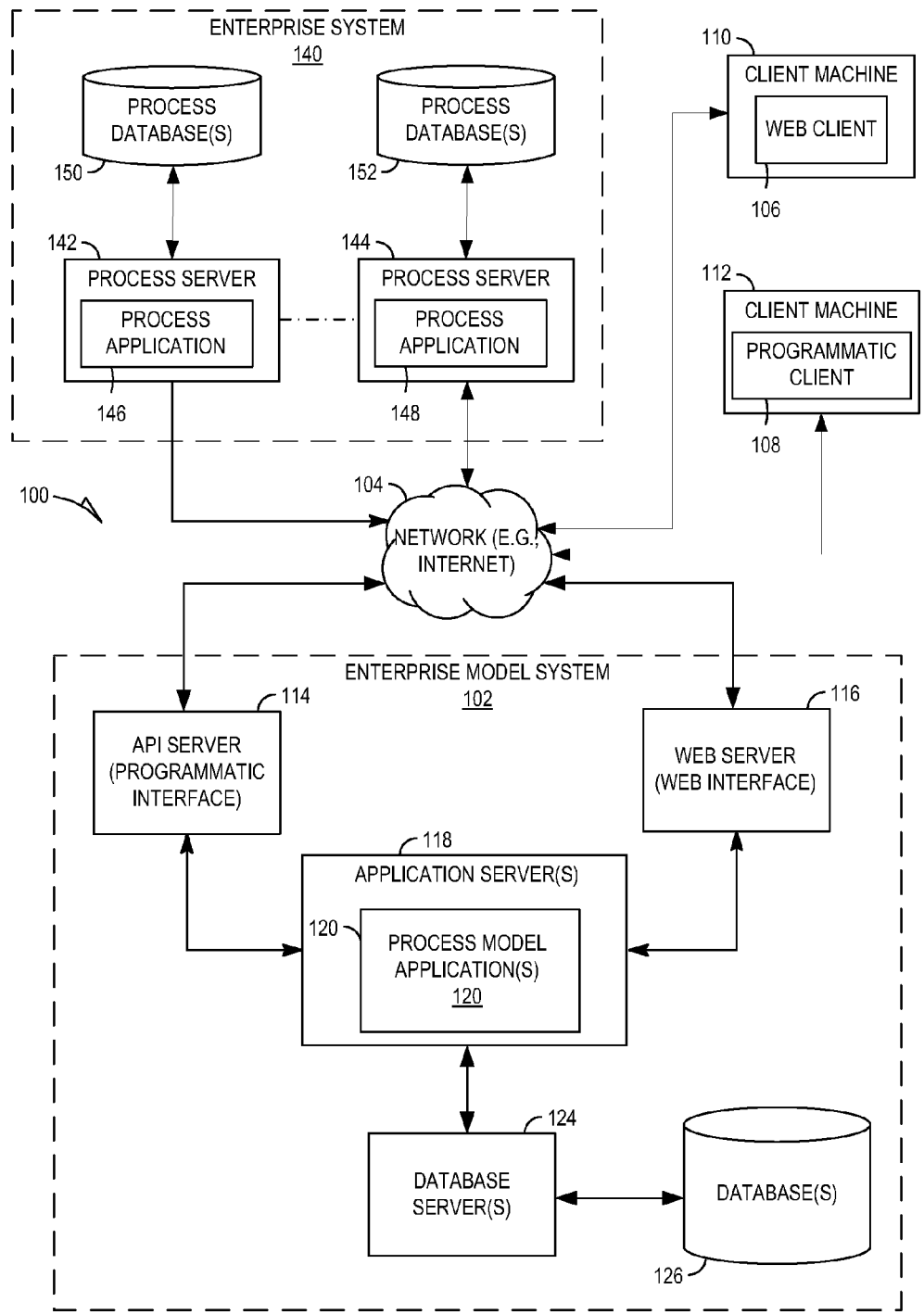
FIG. 1 is a schematic block diagram of a process modeling system in the example form of an enterprise model system interfaced with an enterprise system, in accordance with an example embodiment.

Example methods and systems to generate a process model or enterprise model and to perform automated analysis of the process model are described. In the following description, for purposes of explanation, numerous specific details are set forth in order to provide a thorough understanding of example embodiments. It will be evident, however, to one skilled in the art that other embodiments may be practiced without these specific details.

According to an example embodiment, there is provided a system and method to generate a process model that includes logical process model information and associated data input information with respect to expected inputs associated with respective process activities of a process. There is also provided a system and method to perform analysis, using one or more processors, of process model information to process data collection efficiency of a process represented by the process model.

The process model information may comprise, at least: a logical process model defining a plurality of activities forming part of the process, with the logical process model specifying relationships between the respective activities; and data input information regarding expected inputs associated with process activities. The process model information may further comprise: IT system dependency information indicative of dependency of respective activities on associated IT system elements, with the IT system dependency information including datastore dependency information indicative of one or more datastores which may be accessed in execution of respective activities; and data dependency information indicative of the dependency of process activities on data in the one or more datastores which may be accessed in execution of respective activities.

The term "process" as used herein comprises a series of activities to produce a product or perform a service, and is to be interpreted broadly as including a process group, a sub-process, or any collection of processes. Therefore, the totality of activities and/or processes which may be performed in an enterprise may also be referred to as a process. In instances where the process model information is therefore with respect to an enterprise, such as a business enterprise, the process model information may thus be in the form of an enterprise model.

The term "data" as used herein refers to any information items that a process may depend upon or utilize and is to be interpreted broadly as including master data, reference data, transaction data, event data, analytical data, meta-data, text or binary content, and the like.

Differently defined, the process model information may be in the form of the logical process model together with operationalization data regarding various components utilized for operationalization of the process and on which process activities may be dependent. The logical process model may include a sequence in which activities of the process are performed; rules determining subsequent activities to be performed; service-level agreements (SLAs); key performance indicators (KPIs); and the like. The operationalization data may include human resource roles for performing respective activities; IT systems supporting respective activities; data dependency information regarding respective activities; data input information indicating expected inputs, which may be associated with particular process activities and/or process participants; physical infrastructure associated with respective activities, such as vehicles, machinery, and the like; and other elements associated with the process. In instances where the process model is in respect to a business enterprise, the resultant enterprise model may therefore depict, specify, or map the workings and interrelationships of all elements that make up an enterprise. Enterprise elements or process elements modeled in such an enterprise model may include a value chain, business domains/sub-domains, business functions/sub-functions, processes, activities, information/data, IT applications, IT hardware, human resources, physical assets, and any other elements relevant to the enterprise.

It is to be appreciated that the term "logical process model" refers to the depiction, specification, or mapping of a series of activities of an associated process, excluding process operationalization elements (e.g., IT system components, human resource information, and data input information).

"Process element" means any element of the process model, including IT hardware, IT applications, human resource components, datastores, physical elements, events, and the like.

The data input information may comprise information regarding the collection of data during performance of the process. The data input information may therefore include a plurality of expected inputs, each expected input being associated with one of the process activities. Each expected input may indicate a particular data element or data item which is to be inputted or collected during performance of an associated process activity. The data input information may further include a source type identifier associated with each expected input, to identify a type of source from which the relevant data element is received. The data input information may yet further include, with reference to each expected input, a duplication acceptance indicator to indicate whether or not a process designer or editor accepted duplication of inputs with respect to the associated data element, and/or a duplication reason indicator to indicate a reason provided by the process designer or editor for input duplication. The terms "duplicate expected input" or "repetitive expected input" as used herein refers to an expected input for which there is at least one other expected input with respect to a common corresponding data element within a particular process or part thereof. The data input information may include forms for collecting a plurality of data elements, the forms optionally being linked to or associated with respective process activities.

The system may further include data state information indicative of the quality and/or availability of data in one or more datastores, which may be accessed in execution of respective activities. The data state information may include data quality information indicative of the data quality of data in at least one datastore forming part of the process system. The data quality information may include data aging information, data validity, data accuracy, data completeness, data consistency, data integrity information, or the like.

It is to be appreciated that the data input information is distinct and separate from, on the one hand, data dependency information, and, on the other hand, data state information. The data state information is with respect to the state and/or quality of data in the process during operation, while the data dependency information is with respect to the dependency of process activities on particular data elements and/or data stores for performance of those process activities. In contrast, the data input information provides a design-time indication of the collection of particular data elements by respective process elements/participants.

The system may include a duplication identifier module to automatically identify duplicated expected inputs and an alert generator to generate a duplication alert in response to identification of expected input duplication. The system may further include an efficiency calculation module to calculate a data collection efficiency value based at least in part on the identified duplicate expected inputs.

Another aspect provides a method comprising:

associating a plurality of expected inputs with respective process activities of a logical process model comprising a logically structured series of process activities in a process, each expected input being indicative of collection of a corresponding data element during execution of the associated process activity; and using one or more processors, analyzing the plurality of expected inputs to calculate a data collection efficiency value with respect to the logical process model, the data collection efficiency value being calculated based at least in part on the identification of repetitive expected inputs with respect to at least one data element Yet another aspect may provide another method comprising:

storing in at least one database a plurality of expected input entries indicative of respective data elements to be inputted into a process system in the execution of a process;

storing in association with each expected input entry information illustrating one or more of a plurality of process activities during which the corresponding data element is to be inputted; and storing in association with at least one of the plurality of expected input entries a duplication reason indicator to indicate that repetitive expected input entries with respect to the corresponding data element is intentional.

Architecture

FIG. 1 is a network diagram depicting a client-server system 100, within which one example embodiment may be deployed. A networked enterprise model system 102, in the example form of a dynamic process modeling system, provides server-side functionality, via a network 104 (e.g., the Internet, a Wide Area Network (WAN), or a Local Area Network (LAN), to one or more clients. FIG. 1 illustrates, for example, a web client 106 (e.g., a browser, such as the Internet Explorer browser developed by Microsoft Corporation of Redmond, Wash. State) and a programmatic client 108 executing on respective client machines 110 and 112.

An Application Program Interface (API) server 114 and a web server 116 are coupled to, and provide programmatic and web interfaces respectively to, one or more application servers 118. The application servers 118 host one or more process model applications 120 (see FIG. 2). The process model applications, in this example, are enterprise model applications. The application server(s) 118 are, in turn, shown to be coupled to one or more databases server(s) 124 that facilitate access to one or more database(s) 126.

The system 102 is also in communication with a process system which supports a process that is to be modeled by the process model application(s) 120 (e.g., business process models (BPM)). In the example embodiment, the process system is a client enterprise system 140, which supports a business enterprise. The system 102 of the example embodiment of FIG. 1 is therefore an enterprise model system, while, in other embodiments, similar or analogous systems may be process model systems for processes such as manufacturing processes, distribution processes, or the like. The process model application(s) 120 may be in communication with components of an IT system of the enterprise, in particular being in communication with a number of process servers 142, 144 forming part of the IT infrastructure of the client enterprise system 140. Each of the process servers 142, 144 supports one or more process applications 146, 148, with each process application 146, 148 providing functionalities employed in the performance of an associated activity or process supported by the enterprise system 140. Each process server 142, 144 may be in communication with one or more associated database(s) or process datastore(s) 150, 152, to read and/or write associated process data to the respective process datastore(s) 150, 152.

For example, process application 146 may be an accounting application, with the process data in the associated process datastore(s) 150 comprising client account information, while process server 144 may be a case management application, with the process data in the associated process datastore(s) 152 comprising records of respective cases processed by the enterprise system 140. It will be appreciated that the enterprise system 140 may typically comprise a greater number of process servers 142, 144 and process datastores 150, 152 than are shown in FIG. 1, but for ease of explanation FIG. 1 shows only two such process servers 142, 144. It is further to be appreciated that communication and interfacing between respective process servers 142, 144 may occur via the network 104, while some of the process servers 142, 144 may be in direct communication.

The process model application(s) 120 may provide a number of functions and services to users that access the enterprise model system 102 (for example, providing analytics, diagnostic, predictive and management functionality relating to system architecture, processes, and the activities of the enterprise supported by the enterprise system 140). Respective modules for providing these functionalities are discussed in further detail with reference to FIG. 2 below. While all of the functional modules, and therefore all of the process model application(s) 120, are shown in FIG. 1 to form part of the enterprise model system 102, it will be appreciated that, in alternative embodiments, some of the functional modules or process model applications may form part of systems that are separate and distinct from the enterprise model system 102.

Further, while the system 100 shown in FIG. 1 employs a client-server architecture, the example embodiments are, of course, not limited to such an architecture, and could equally well find application in a distributed, or peer-to-peer, architecture system, for example. The process model application(s) 120 could also be implemented as standalone software programs, which do not necessarily have networking capabilities.

The web client 106 accesses the process model application(s) 120 via the web interface supported by the web server 116. Similarly, the programmatic client 108 accesses the various services and functions provided by the process model application(s) 120 via the programmatic interface provided by the API server 114.

Process Model Application(s)

Figure 2:
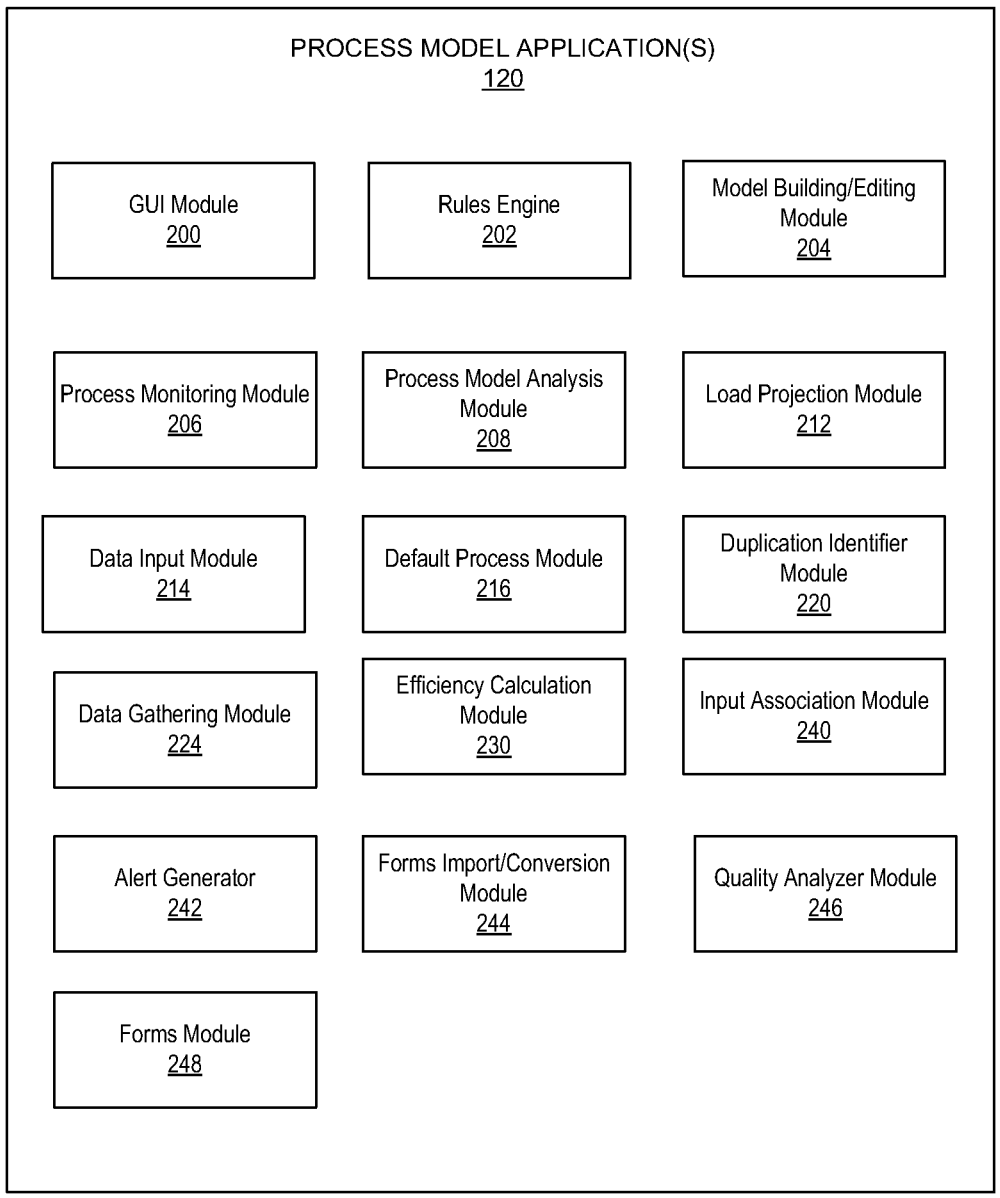
FIG. 2 is a schematic block diagram of process model application(s) forming part of the example process analysis system.

FIG. 2 is a block diagram illustrating multiple functional modules of the process model application(s) 120 of enterprise model system 102. Although the example modules are illustrated as forming part of a single application, it will be appreciated that the modules may be provided by a plurality of applications. The modules of the application(s) 120 may be hosted on dedicated or shared server machines (not shown) that are communicatively coupled to enable communications between server machines. The modules themselves are communicatively coupled (e.g., via appropriate interfaces) to each other and to various data sources, to allow information to be passed between the modules or to allow the modules to share and access common data. The modules of the application(s) 120 may furthermore access the one or more databases 126 via the database servers 128.

The enterprise model enterprise model system 102 may therefore provide a number of modules whereby a user may build or define a process model(s) or enterprise model for the enterprise system 140, monitor the execution of activities forming part of the process, and perform automated diagnostic or predictive analysis of the process model. To this end, the application(s) 120 are shown to include at least one default process model module 216 to provide default process models. In instances where the process model is in respect to a business enterprise, the default process model module 216 may provide default BPMs, which are to serve as bases for a user to define a business process model specific to the enterprise system 140. The default BPMs may be predefined by a supplier of the business process model application(s) 120 and are in respect to generic business processes relating to a variety of types of businesses or types of business activities. A user may thus, as a starting point for defining an enterprise-specific BPM, select one or more default process models which most closely approximate the business processes performed by the enterprise system 140. The default process model module 216 may typically provide default logical process models indicating a series of activities, without specific operationalization information indicating particular process elements or support elements on which the activities are dependent.

A model building/editing module 204 is provided to enable a user or administrator to define a specific process model, either by editing, adapting, or building on a selected default process model, or by building a process model from scratch. The terms administrator, user, designer, and editor are used interchangeably herein to indicate a person who performs design-time activities with respect to the process model. The model building/editing module 204 also enables the editing of the process model in response to changes in the process system 140 or the associated processes. As mentioned above, such a process model may represent sequences and relationships of business processes and business process activities, as well as the relationships of such business process activities to the IT infrastructure, process applications 146, 148, expected inputs, and process data. An example enterprise model is described in greater detail with reference to FIGS. 4-7 below.

As described above, the enterprise model system 102 may include logical process model information together with data input information to indicate a plurality of expected data inputs. The logical process model information may define a plurality of activities forming part of the process and may define the relationship between activities, such as the sequence in which activities are performed, and/or rules determining choices between respective activities. Dependency information defines process elements which contribute to performance of respective process activities. The dependency information may include IT system dependency information, which defines IT system elements, such as software and hardware components, contributing to respective activities. The dependency information may further include human resource dependency information, which defines particular human resources, people, or personnel contributing to respective activities. The dependency information may also include, as part of the IT system dependency information, datastore dependency information that indicates the relationship between respective activities and associated datastores that are accessed during execution of the respective activities.

The process model application(s) 120 further include a graphic user interface (GUI) module 200 to generate and manage an interactive GUI to display various aspects of the process model and to permit user management of the process model. In instances where all the processes of the enterprise system 140 are defined in a process model (e.g. instances where the process model is an enterprise model), it is typically not possible to display a representation of all of the processes and/or an entire business architecture in a single view, and the GUI will allow user selection of different levels or layers of the enterprise model for viewing. Such drill-down functionality is described in greater detail below with reference to FIGS. 4-7.

A data input module 214 provides functionality to permit the input of data for use in process model analysis. Information about scheduled downtime for the process applications 146, 148 and/or scheduled downtime for IT infrastructure elements may, for example, be input via the data input module 214. Similarly, in an example embodiment, human resource scheduling information, such as information about personnel availability (e.g., holiday calendars) may also be input into the enterprise model system 102. The data input module 214 may be configured for manual input of this information, and may instead or in addition provide for automatic integration of scheduling data from other databases. For example, personnel unavailability data may automatically be obtained from a Human Resources database (not shown) forming part of the enterprise system 140.

A rules engine 202 may be provided to permit the definition of metrics by which the performance of business processes is to be measured. A user may thus provide, via the rules engine 202, failure definitions that specify what constitutes failure of a particular business process. In an example embodiment, the business process model may include SLAs which specify, in measurable terms, contractual service commitments describing the minimum performance criteria an associated process is required to meet. Failure to comply with the requirements of an SLA may be specified as constituting failure of the associated process. The rules engine 202 may further enable the definition of performance indicators, such as KPIs, in relation to respective processes or process activities. Such performance indicators serve to provide quantifiable performance measurement of an associated process or process activity.

The model building/editing module 204 may include an input association module 240 to effect user provision of expected inputs. The provision of expected inputs may comprise the association of particular data elements with specified process activities. A user may thus specify that a particular data element is to be received by a particular process entity in an associated process activity. The input association module 240 may also permit a user to input information regarding a type of source from which the expected input is to be received. The system may further include a duplication identifier module 220 to identify duplicate expected inputs in a particular process or part thereof. The duplication identifier module 220 may therefore be configured to identify when more than one expected input with respect to a common data element is associated with the process activities of the logical process model.

The process model application(s) 120 may further include an alert generator 242 to automatically generate a duplication alert in response to the identification of expected input duplication by the duplication identifier module 220. The alert generator 242 may, for example, be configured to generate a duplication alert upon entry of an expected input by association of a particular data element with a process activity, if that particular data element already forms part of an expected input associated with another process activity. The alert generator may also be configured to prompt the user to accept or reject the identified duplicate expected input, and/or to provide a reason for the particular duplicate expected input.

A forms module 248 may provide form design functionality with respect to forms to be used in the process for data collection or input. The forms module 248 may therefore provide a user the functionality to design a form layout and to define one or more data elements which are to be collected by means of the form. Such a form may, in some embodiments, be presented in a GUI having one or more GUI elements, such as text boxes or the like, for receiving respective data inputs. Design of a form by way of the forms module 248 may thus include the association of each GUI element with a respective data element. A form designed by means of the forms module 248 may be associated with a particular process activity at the outset or after completion of designing the form. The duplication identifier module 220, as well as the alert generator 242, may cooperate with the forms module 248 to provide design-time duplication identification and duplication alerts. A user may thus be alerted to duplication of expected input upon the association of a particular data element with a form (if the form has already been associated with a particular process activity) or upon association of the form with one of the process activities.

Instead, or in addition, the process model application(s) 120 may include a forms import/conversion module 244 to facilitate design of forms in applications which may not be integrated with the process model and the subsequent importation of such forms into the process model. A user may, for example, wish to design forms in an application such as MS Visio™ or MS Excel™ and thereafter to associate these forms with respective process activities. The forms import/conversion module 244 may serve to convert and import such forms, while facilitating expected input duplication identification by the duplication identifier module 220 and the generation of a duplication alert by the alert generator 242. Such form input/conversion may be performed in a batch process.

The process model application(s) 120 may further include a quality analyzer module 246 to analyze and/or enforce consistency in data element definition within the process model and its associated forms. The quality analyzer module 246 may, for example, compare a data element defined by a process designer or user in a form, or explicitly associated with a process activity, with a data enterprise model. The data enterprise model may comprise a list of data elements for use in the process model and may therefore effectively function as a dictionary for data element definitions in the process model. The quality analyzer module 246 may, in response to a failure to identify an exact match in the data enterprise model for a user-provided data element, identify alternative data elements based on semantic and/or phonetic similarities between the user-provided data element and the alternative data elements. The quality analyzer module 246 may then suggest the alternative data elements to the user.

The process model application(s) 120 may further include a data gathering module 224 to gather and collate, at runtime, information regarding the performance of respective processes and/or activities. To this end, the data gathering module 224 may cooperate with monitoring applications (not shown) installed in each of the process servers 142, 144 and/or client machines (not shown) forming part of the enterprise system 140. The system 102 may thus gather and record information regarding activities performed by respective elements forming part of the enterprise system 140. A data event, such as data synchronization, data collation, or data transfer between two data repositories, may be logged or recorded, to facilitate tracking or monitoring of performance of the associated business activities.

To this end, the application(s) 120 may include a process monitoring module 206 to monitor performance of the processes defined in the process model. Data gathered by the data gathering module 224 may thus automatically be compared to process activities which are scheduled according to the process model, thereby to identify process event failures. The process monitoring module 206 may further compile historical data regarding system failures. Such historical data may, in particular, include applications failure history, infrastructure failure history, physical infrastructure failure history, and the like. An application failure may, for example, include failure of a process application to execute, while an infrastructure failure may comprise unscheduled downtime of a server or unavailability of communication links between system components.

To facilitate process management, the process model application(s) 120 may include a load projection module 212 to calculate a projected load on particular processes and/or activities defined in the enterprise model. "Load" means the amount of work that is performed by a process at a particular point in time or over a particular period. The load on a particular process or process activity may, for example, be calculated as a number of cases scheduled to be processed. A "case" is an instance of a process. For example, in a process for generating invoices, a particular case may refer to a specific invoice generated for a particular customer. Load projection may be calculated with respect to a particular process step or activity, with respect to a specified process or subprocess, with respect to a process group, or with respect to the entirety of the enterprise model. The load projection module 212 may be configured to calculate the load projection based, in part, on current load information, which may be gathered by the data gathering module 224.

A process model analysis module 208 may provide for automated or computer-assisted analysis of the process by analysis of the process model. Analysis functionality provided by the process model analysis module 208 may include analysis of the data collection efficiency of the process. To this end, the process model analysis module 208 may include an efficiency calculation module 230 to calculate a data collection efficiency value based at least in part on duplicate expected inputs identified by the duplication identifier module 220. The process model analysis module 208 may also provide the functionality of comparing the data collection efficiency of an as-is process with that of a to-be process or comparing the data collection efficiency of separate processes.

Data Structures

Figure 3:
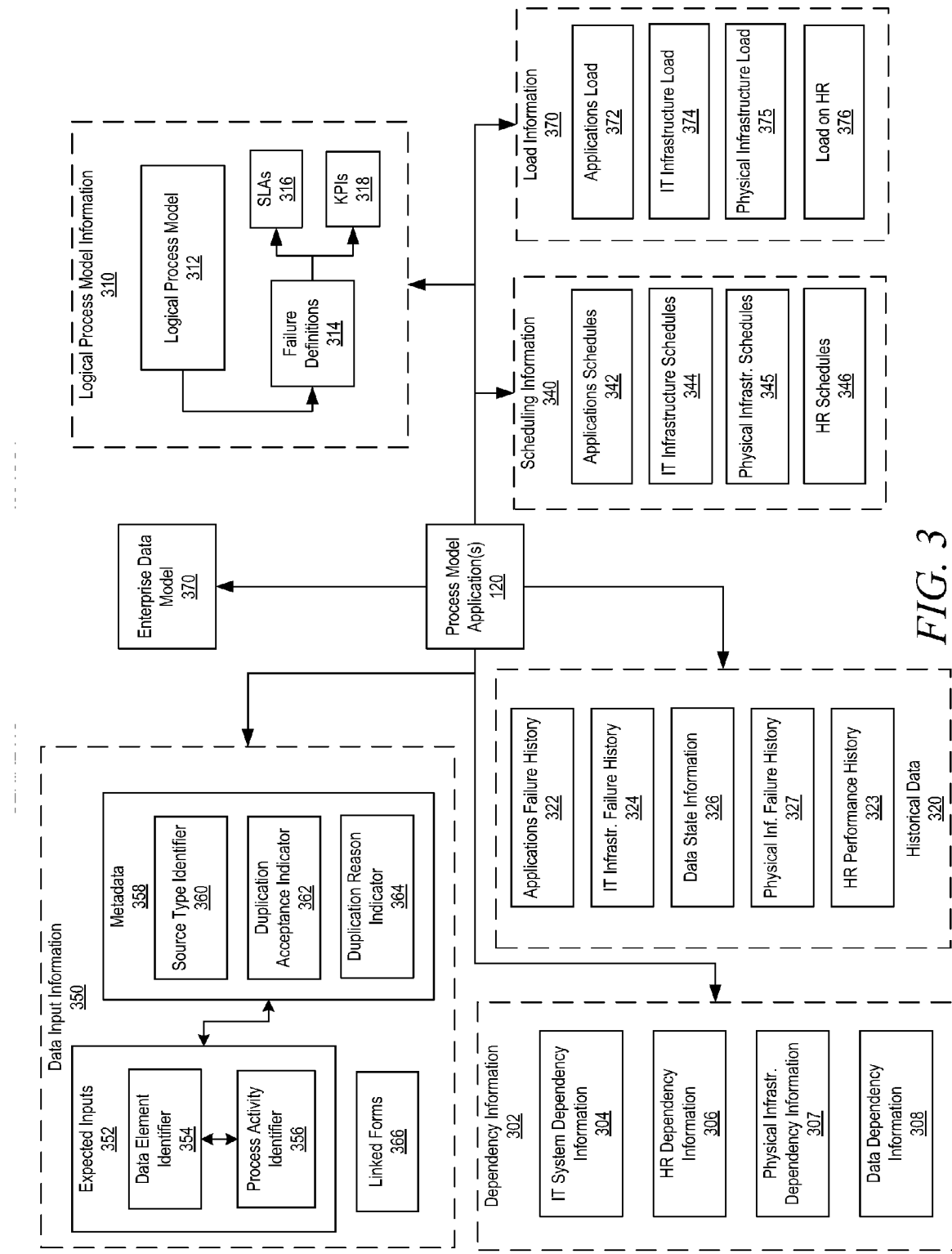
FIG. 3 is a schematic diagram of a data structure of process model information, according to an example embodiment

FIG. 3 is an entity-relationship diagram, illustrating various memories, tables, data repositories, or databases that may be maintained within the database(s) 126 (FIG. 1), and that may be utilized by the process model application(s) 120. The database(s) 126 may include logical process model information 310 representative of processes and activities performed by the enterprise system 140. The logical process model information 310 includes a logical process model 312 comprising structured data defining process activities included in the process and showing relationships between respective process activities. In the current example, the logical process model 312 may be a logical process model defining the sequence of process activities abstractly, without defining the relationships of the activities or processes to process elements associated with operationalization of the process, which may be provided by the dependency information 302. The logical process model 312 references failure definitions 314 which may include SLAs 316 and KPIs 318. The failure definitions 314, SLAs 316, and KPIs 318 may be user-specified via the rules engine 202 (FIG. 2).

The system 102 may include data input information 350 regarding a plurality of expected inputs associated with respective process activities of the logical process model 312. Information regarding each expected input 352 may comprise a data element identifier 354, identifying a particular data element which is to be collected during performance of the process, together with a process activity identifier 356, identifying an associated process activity of the logical process model 312 during which the particular data element is to be collected. It will be appreciated that although in the embodiment illustrated with reference to FIG. 3, the data input information 350 and the logical process model information 310 are shown to be stored separately, with each expected input 352 being linked to a particular process activity of the logical process model 312 by its associated process activity identifier 356, different data structures may be employed in other embodiments, such as, for example, storing data element identifiers 354 in direct association with respective process activities in the logical process model information 310, so that the data input information 350 effectively forms part of the logical process model information 310.

Each expected input 352 may have associated therewith a source type identifier 360 to identify the particular type of source from which the associated expected input 352 is to be collected during execution of the process. The source type identifier 360 may identify one of a predetermined plurality of source types, for example, identifying a source type selected from the group comprising an external organization, an internal organization, and a computer application/system.

The data input information 350 may further include a duplication acceptance indicator 362 associated with each expected input 352. The duplication acceptance indicator 362 may serve to indicate that a user has accepted that the expected input 352 associated with the duplication acceptance indicator 362 is a duplicate expected input 352. As is explained in greater detail below, a user/designer may automatically be alerted, in response to generating an expected input 352 by associating a data element with a process activity, to the fact that the newly generated expected input 352 is a duplicate expected input, and may be prompted to indicate whether or not the duplicate expected input is to be accepted. In response to affirmative indication from the user/designer, a duplication acceptance indicator 362 may be associated with the newly generated expected input 352.

The data input information 350 may further include a duplication reason indicator 364 illustrating a reason for duplication of the associated expected input 352. The information represented by the duplication reason indicator 364 may again be gathered from a user/designer upon generation of the expected inputs 352. It will be appreciated that intentional input duplication may be included in a process for a variety of reasons. In one embodiment, a user may be prompted to select one of a predetermined list of duplication reasons, for example, from a drop down menu. In such a case, the predetermined list of duplication reasons may include a state change of data, validation from compliance/risk of correctness perspective, requirement from a tracking perspective, and an update on existing data. The source type identifiers 360, the duplication acceptance indicators 362, and the duplication reason indicators 364 may form part of metadata 358 associated with the respective expected inputs 352. In one embodiment, the entry of a source type identifier 360 may be mandatory, in that the entry of a source type identifier 360 is a prerequisite for creating an expected input.

The data input information 350 may yet further include linked forms 366 comprising a plurality of forms that may be used during execution of the process to collect information or inputs. Each linked form 366 may comprise layout information indicating the visual layout of the form, together with information of the data elements that are to be collected by means of the form. In instances where the form is to be presented on a GUI of a terminal or a computer, the linked form 366 may define a plurality of user interface elements forming part of the form, and may associate particular data elements that are to be collected with particular user interface elements of the form. The data input information may additionally include information indicating particular process activities of the logical process model 312 with which respective linked forms 366 are associated. It will be appreciated that expected inputs 352 can thus be created by explicitly associating data elements or data element identifiers 354 with respective process activities, or, instead, a user/designer may create forms which include information indicating the data elements collected by the forms, and may thereafter associate such forms with respective process activities, thereby creating the linked forms 366. Association of a linked form 366 with a particular process activity may automatically result in the creation of one or more expected inputs 352, with each data element to be collected by the form automatically being associated with the relevant process activity to which the form has been linked.

The process model application(s) 120 may also access an enterprise data model 370 that comprises a list of data elements in the system 102. The enterprise data model 370 may therefore function effectively as a data element dictionary, to facilitate consistency in the use of data element identifiers 354. As described in greater detail below, semantic and/or phonetic similarity searches may automatically be conducted upon the entry by the user of a data element identifier, and alternative data identifiers from the enterprise data model 370 may be suggested to the user if no exact match to the data element identifier 354 entered by the user can be found in the enterprise data model 370. Information in the enterprise data model 370 may be arranged according to an entity to which respective data element identifiers pertain. For example, address information may be grouped together, so that data element identifiers for an address line, a city address, a state identifier, a zip code, and a zip extension code may be grouped together under an "address" group.

The databases 126 may further may include dependency information 302 comprising structured information regarding dependencies of respective processes and/or process activities of the enterprise model. The dependency information 302 may include IT system dependency information 304 that comprises information regarding process dependency on IT system elements of the enterprise system 140. The IT system dependency information 304 may thus include information regarding dependency of processes or activities on software such as process applications 146, 148, as well as dependency on IT infrastructure. The IT system dependency information 304 also includes datastore dependency information indicative of relationships between respective activities and datastores that are accessed in performance of the respective activities. The IT system dependency information 304 enables the generation of an interactive GUI displaying those process applications and process servers on which a selected process or process activity is dependent.

The dependency information 302 may further include human resources dependency information 306 in which is stored structured information regarding the dependency of respective processes or process activities on particular human resource components, such as people or personnel. The HR dependency information 306 may, for example, specify the job role or personnel department responsible for the performance of a particular process activity. Physical infrastructure dependency information 307 may also be included in the dependency information 302 to indicate the dependency of respective process activities on physical infrastructure components. Such physical infrastructure components may include, for example, vehicles, machinery, supply-chain elements, buildings, and the like. Data dependency information 308 may illustrate the dependency of process activities on data in the one or more datastores which may be accessed in execution of respective activities.

The system 102 further comprises historical data 320 indicative of past performance of processes defined in the logical process model 312, as well as being indicative of the latest state of process elements and data in respective datastores. The historical data 320 may preferably be gathered in real-time or near real-time, optionally being gathered upon performance of the respective processes or process activities. Instead, or in combination, the historical data 320 may be gathered at predefined times or intervals. Historical data 320 may include applications failure history 322 indicative of failure of process applications 146, 148, as well as IT infrastructure failure history 324 indicative of past failures of IT infrastructure elements, such as process servers 142, 144. The historical data 320 may further include physical infrastructure failure history 327 with respect to failure of physical infrastructure elements, such as vehicles, machinery, and the like. Human resource performance history 323 may also form part of the historical data 320, to provide information regarding historical performance of particular human resource components such as personnel, personnel departments, operational units, and the like. The historical data 320 may further include data state information 326 indicative of the current or latest recorded state of data in respective datastores of the enterprise system 140. In some embodiments, the generation and storage of historical data 320 may be omitted.

Scheduling information 340 may be provided to facilitate risk analysis or predictive analysis. The scheduling information may include: applications downtime schedules 342 indicating scheduled unavailability or downtime of process applications 146, 148; IT infrastructure downtime schedules 344 indicating scheduled unavailability of IT infrastructure elements or components, such as process servers 142, 144; physical infrastructure schedules 345 indicating scheduled availability of physical infrastructure elements; and human resource schedules 346, which may include holiday calendars or personnel unavailability schedules, to indicate when personnel, people, or other human resource components supporting the process are scheduled for unavailability. In some embodiments, the generation and storing of scheduling information 340 may be omitted.

The databases 126 may furthermore include load information 370 regarding a current and a projected load on respective elements in the process. In particular, the load information 370 may include information on applications load 372 indicative of current and projected load on process applications 146, 148; IT infrastructure load 374 indicative of current and projected loads on the IT infrastructure the enterprise system 140; physical infrastructure load 375 indicative of current and projected loads on physical infrastructure elements; and information regarding current and projected load on human resources 376. Provision of the load information 370 facilitates analysis of the business process model, and may be particularly useful in load balancing management analysis, but in some embodiments, the generation and storing of load information 370 may be omitted.

As illustrated in FIG. 3, the process model application(s) 120 may access the logical process model information 310, the data input information 350, the enterprise data model 370, the dependency information 302, the historical data 320, the scheduling information 340, and the load information 370 during process model creation/editing and/or during process analysis. In particular instances, the duplication identifier module 220, forming part of the process model application(s) 120, may access the data input information 350 and the logical process model information 310 to identify duplicate expected inputs 352.

Figure 4:
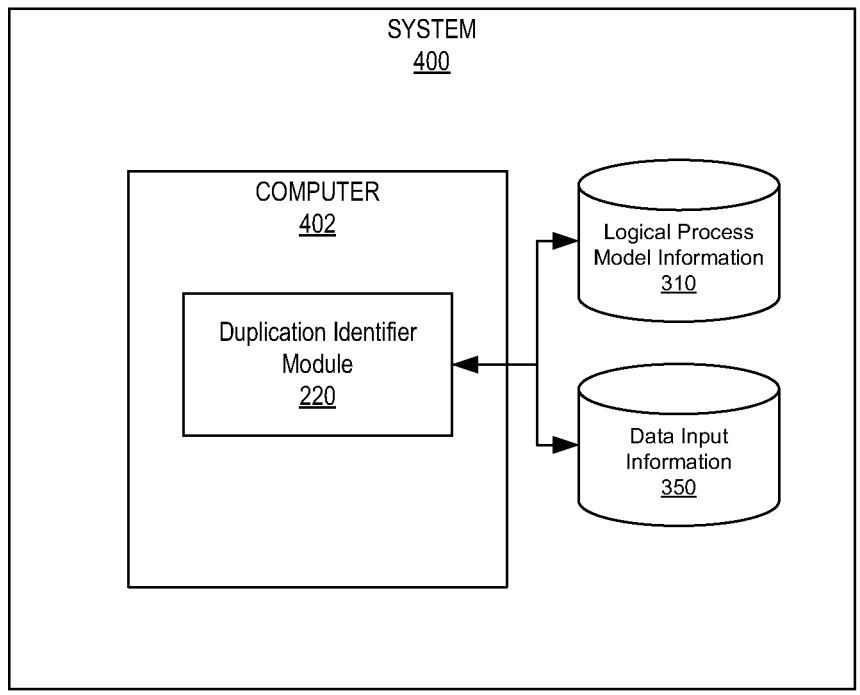
FIG. 4 is a high-level schematic diagram of an example system for detecting wasteful data collection in a process.

FIG. 4 is a high-level entity relationship diagram of an example configuration of a process model system 400. The system 400 may include a computer 402, which may include a duplication identifier module 220 to perform analysis on data input information 350 with respect to logical process model information 310, to identify the duplicate expected inputs Like numerals indicate like elements in FIG. 3 and in FIG. 4.

The system 400 includes a number of databases or memories to store the logical process model information 310 and the data input information 350. It is to be noted that these databases are illustrated as separate entities, but that process model information can instead be stored in a single database, or in a greater number of dispersed databases, while the process model information may be stored either internally in the computer 402 or may be stored externally. In this context, the terms database and memory are to be understood as being equivalent.

GUIs

Figure 5:
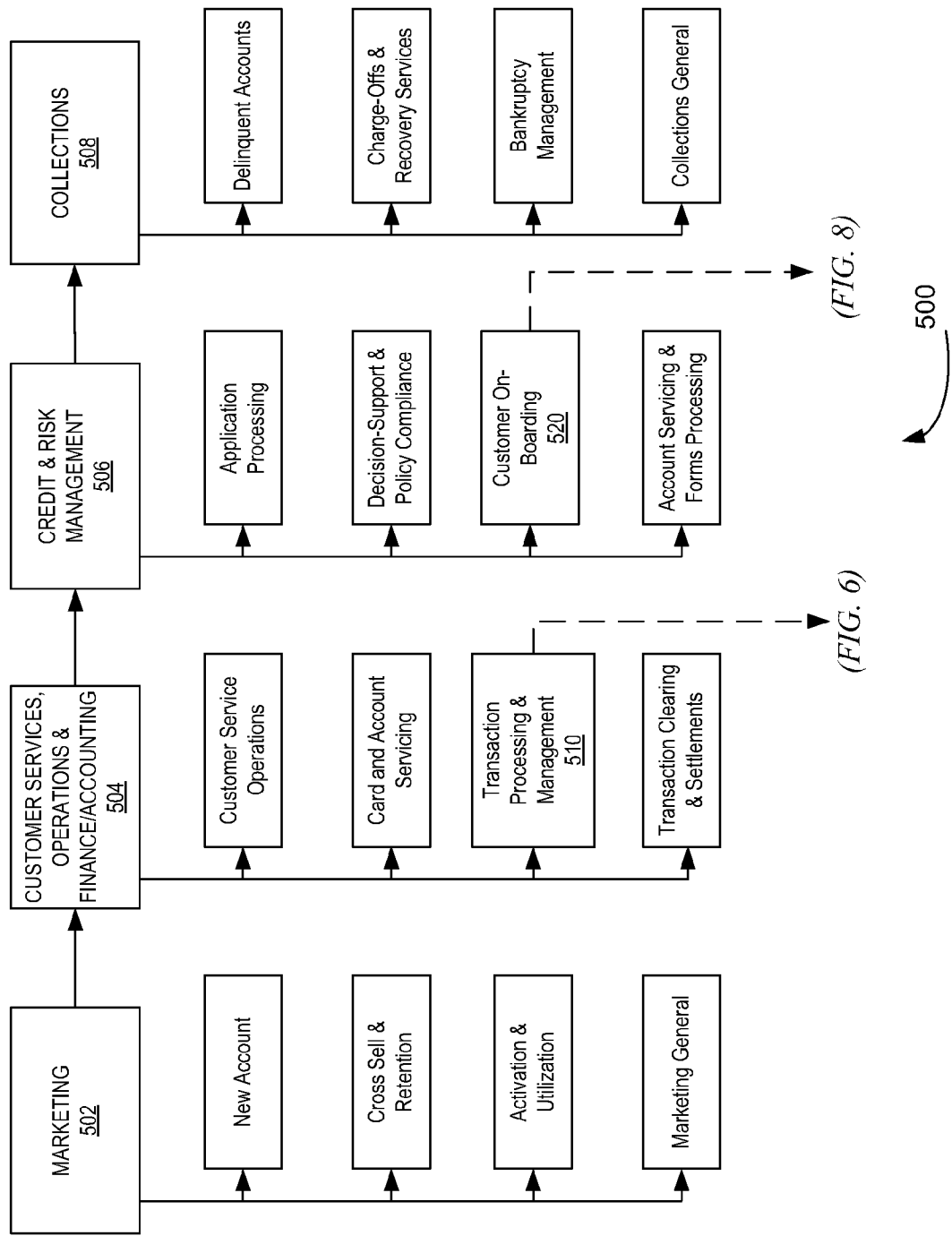
FIG. 5 is a high-level view of a value chain forming part of an enterprise model, according to an example embodiment.

The concepts described above will now be further explained by way of example with reference to extracts from example GUIs that may be generated by the GUI module 200, according to an example embodiment. FIG. 5 indicates an example graphical representation of a value chain diagram 500 providing an overview of an example process defined by a process model, which may be an enterprise model. The value chain represents the chain of business activities that generate value for an enterprise. The example value chain diagram 500 is with respect to a business that provides credit card services to customers. The value chain diagram 500 represents the highest level of the enterprise model and comprises, at the highest level, a series of organizational units. In this example, the value chain diagram 500 comprises the organizational units of Marketing 502; Customer Services, Operations and Finance/Accounting 504; Credit and Risk Management 506; and Collections 508.

It is to be noted that, at the highest level of the value chain, different enterprises in a particular industry or field of business may be somewhat similar. For example, all computer chip manufacturing firms may have a similar sequence of elements, such as fabrication. However, the enterprise model includes further levels, which indicate the organization of the particular enterprise, and in such low levels there may be great differences between respective enterprises in the same field. The particular organization of an enterprise may be influenced by the scale of operations, the history of the enterprise, and a variety of other factors. For instance, two cable television (TV) companies operating in adjacent markets and offering near identical products may be completely different in their organization at lower levels. In other examples, the value chain diagram may decompose the enterprise process, at a high level, according to business domains. In this regard, "business domain" is understood as a particular line of business. For example, in a financial services organization, domains can include Deposits, Loans, Investments, and Insurance. Such domains can be further decomposed in sub-domains. A business domain of Loans can, for instance, be comprised of Corporate and Personal sub-domains.

As illustrated in FIG. 5, the value chain diagram 500 specifies the functional decomposition of each of the organizational units 502 to 508 in respective series of functions or processes. Thus, for example, the organizational unit of customer services, operations and finance/accounting 504 is comprised of a series of functions or processes. A user can view further organizational details or functional decomposition of each of the functional processes constituting the organizational unit 504, by selecting the associated function or process in the GUI. Organizational units may thus be categorized by the function they perform. It is to be noted that functions may be specific to a business domain/sub-domain or may be shared across domains/sub-domains. For example, recruiting and other human resource functions may be shared functions, while, for instance, warehouse operations may be specific to a sales and distribution area of a large retailer.

Figure 6:
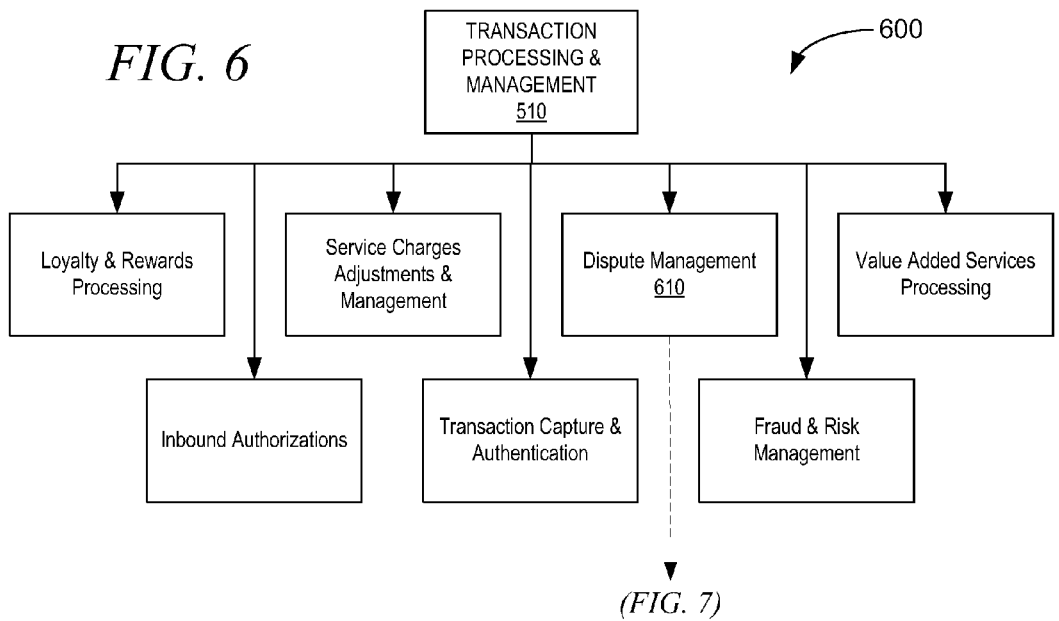
FIG. 6 is a lower-level view of the example enterprise model of FIG. 5, diagrammatically showing functional decomposition of one of the elements of the value chain.

FIG. 6 indicates a functional decomposition diagram 600 of the function of Transaction Processing and Management 510, specifying a series of sub-functions which includes Dispute Management 610. The diagram 600 of FIG. 6 is thus a lower-level view of one of the functions forming part of the diagram 500 of FIG. 5, and it will be appreciated that each of the functions shown in FIG. 5 may similarly be viewed at a lower-level or in greater magnification.

Figure 7:
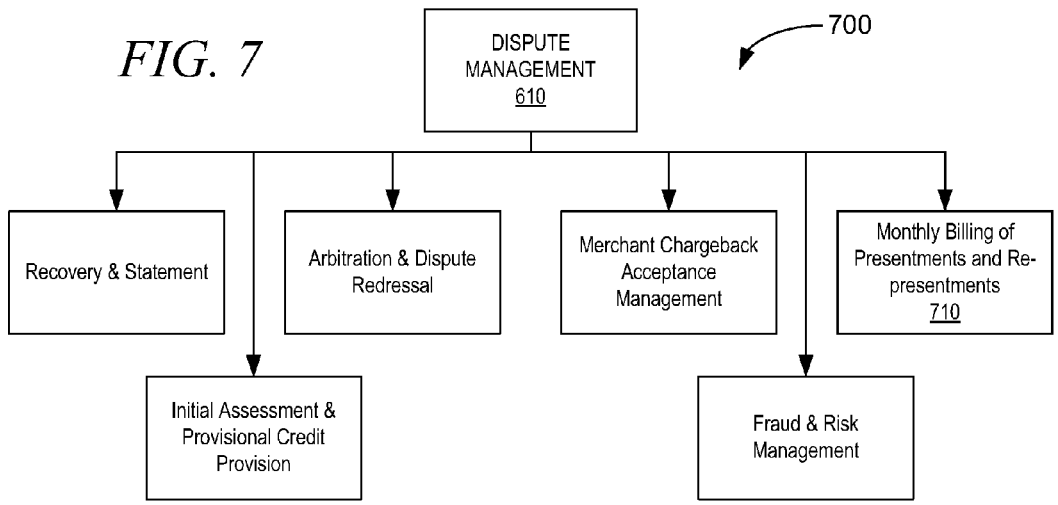
FIG. 7 is another lower-level view of the enterprise model of FIG. 5, diagrammatically illustrating the key processes in one of the functions of FIG. 6.

Likewise, diagram 700 in FIG. 7 shows yet further functional decomposition of the sub-function of Dispute Management 610, which comprises a series of processes forming part of the Dispute Management 610 sub-function. One of these processes is Monthly Billing of Presentments and Re-Presentments 710. A user can select any one of the processes of FIG. 7 to view a process model specifying a series of activities comprising of the process, as well as dependency information of the process activities. It is to be appreciated that decomposition of a process into a series of process activities may be provided at the level of the enterprise model. In this example embodiment, aspects relating to the detection of wasteful data collection and the identification of duplicate expected inputs will be further described with reference to a customer on-boarding process 520 referenced at a high level in FIG. 5.

Figure 8:
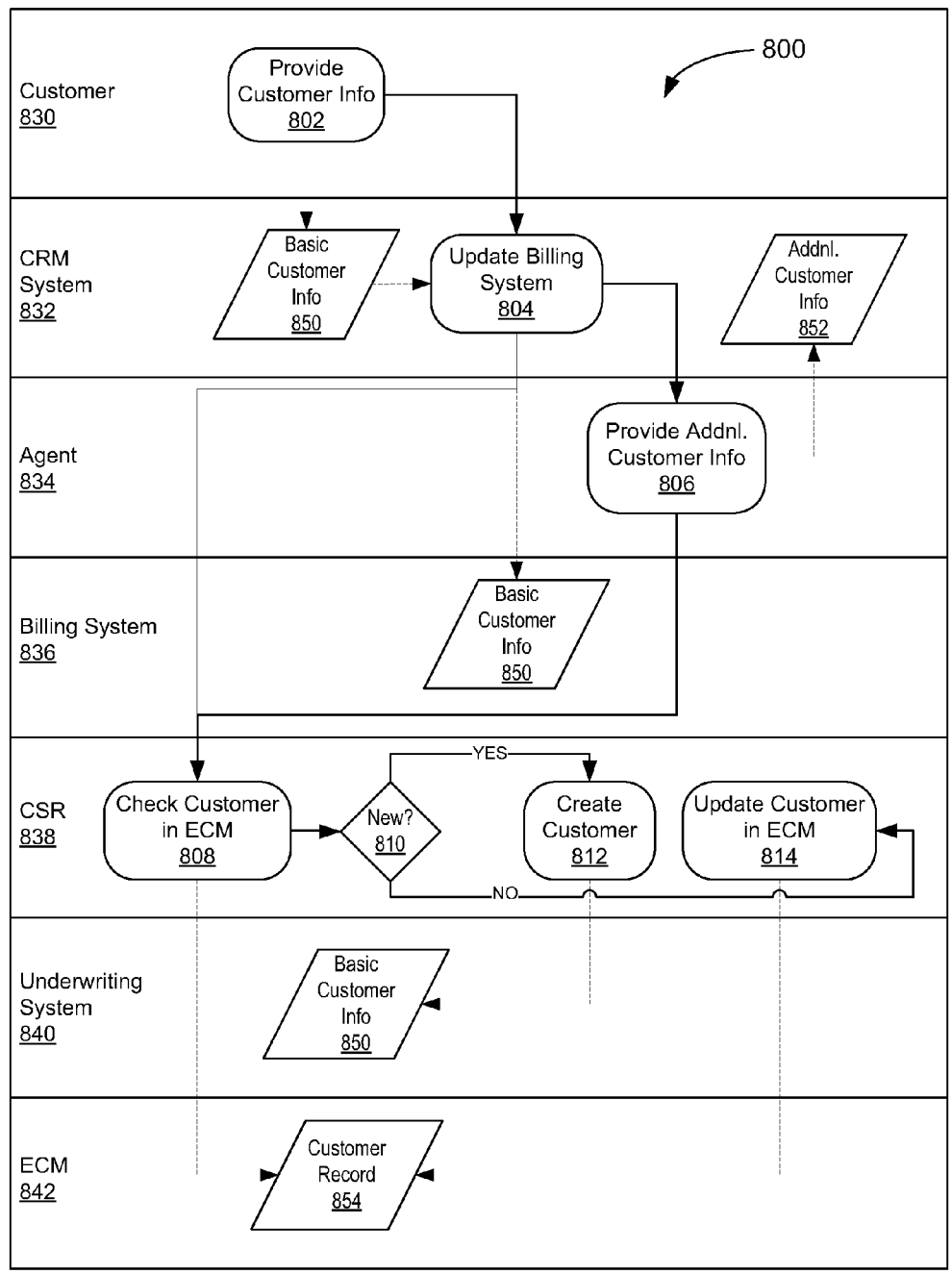
FIG. 8 is diagrammatic view of an example of a process model, showing a series of expected inputs associated with respective process activities.

FIG. 8 shows a suppliers, inputs, process, outputs, and customers (SIPOC) diagram 800 representative of such an example process model for the process of customer on-boarding 520 (FIG. 5. It is to be appreciated that the user may thus drill down to a specific process model, as exemplified by the various levels of the enterprise model illustrated in FIGS. 4-7. The number of levels of the enterprise model may vary depending on the complexity of the enterprise.

The process 800 may include a logical process model indicating a sequence of activities 802-814. Entities responsible for performance of the respective process activities are indicated in the diagram of FIG. 8 by location of blocks representing the activities 802-814 in one of a number of bands or "swim lanes" 830-842.

The customer on-boarding process is initiated by the provision of basic customer information 850, at block 802, by a customer 830. In the current example, the basic information 850 comprises the following data elements, with respective data element identifiers 354 provided in parenthesis: a customer name (Cust_Name), an organization with which the customer is associated (Cust_Org), a customer e-mail address (Cust_Email), a customer telephone number (Cust_Phone), and a customer address (Cust_Address). Each of the data elements comprising the basic customer information 850 is associated with the operation of providing customer information, at block 802, and is therefore an expected input in the process 800.

This basic customer information 850 is used by a customer relations management system (CRM) 832 to update a billing system 836, at operation 804. Such updating may comprise provision of the basic customer information 850 to the billing system 836 by the CRM system 832. A customer service representative (CSR) 838 may thereafter check, at operation 808, whether or not the customer is an existing customer. To this end, the CSR 838 references an enterprise content management system (ECM) 842. If, at decision block 810, it is determined that the basic customer information 850 is with respect to a new customer, then the CSR 838 performs the operation, at block 812, of creating a new customer in an underwriting system 840. The new customer is therefore created with reference to the basic customer information 850, which is provided to the underwriting system 840 by the CSR 838. If, however, it is determined, at decision block 810, that the information is with respect to an existing customer, as would be indicated by the existence of a customer record 854 for the particular customer in the ECM 842, then the CSR 838 performs the operations, at block 814, of updating the customer record in the ECM 842.

The process may include the provision of additional customer information 852 with respect to the customer 830 by an agent 834. In the present example embodiment, the data elements provided as part of the additional customer information 852 may comprise a customer telephone number (Cust_Phone), a customer e-mail (Cust_Email), an industry segment to which the customer is active (Cust_Segment), and a customer's estimated revenue (Cust_Revenue). As can be seen in FIG. 8, the additional customer information 852 provided by the agent 834 is consumed by the CRM system 832. After provision of the additional customer information 852, the customer service representative 838 may again check, at block 808, whether or not the customer has a record in the ECM 842. If a customer record 854 has already been created, then the CSR 838 may update the customer record 854, at operation 814.

Flowcharts

Figure 9:
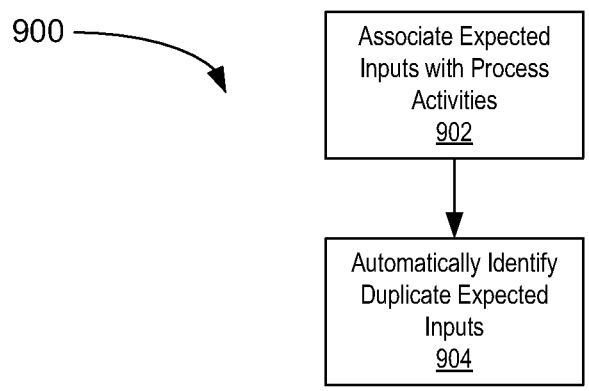
FIG. 9 is a high-level flow chart of an example method of detecting wasteful data collection in a modeled process.

FIG. 9 illustrates, at a high level, a flowchart for a method 900 of detecting wasteful data collection in a process. The method comprises associating expected inputs with respective process activities, at block 902, and thereafter automatically identifying duplicate expected inputs, at block 904. By automatically identifying duplicate expected inputs and bringing such duplicate expected inputs in a defined process, such as that described with reference to FIG. 8, to the attention of a user who is designing the process, the process may be optimized to minimize wasteful data collection. Automatic identification of duplicate expected inputs may also be used to assess data collection efficiency of a particular process or part thereof.

Figure 10:
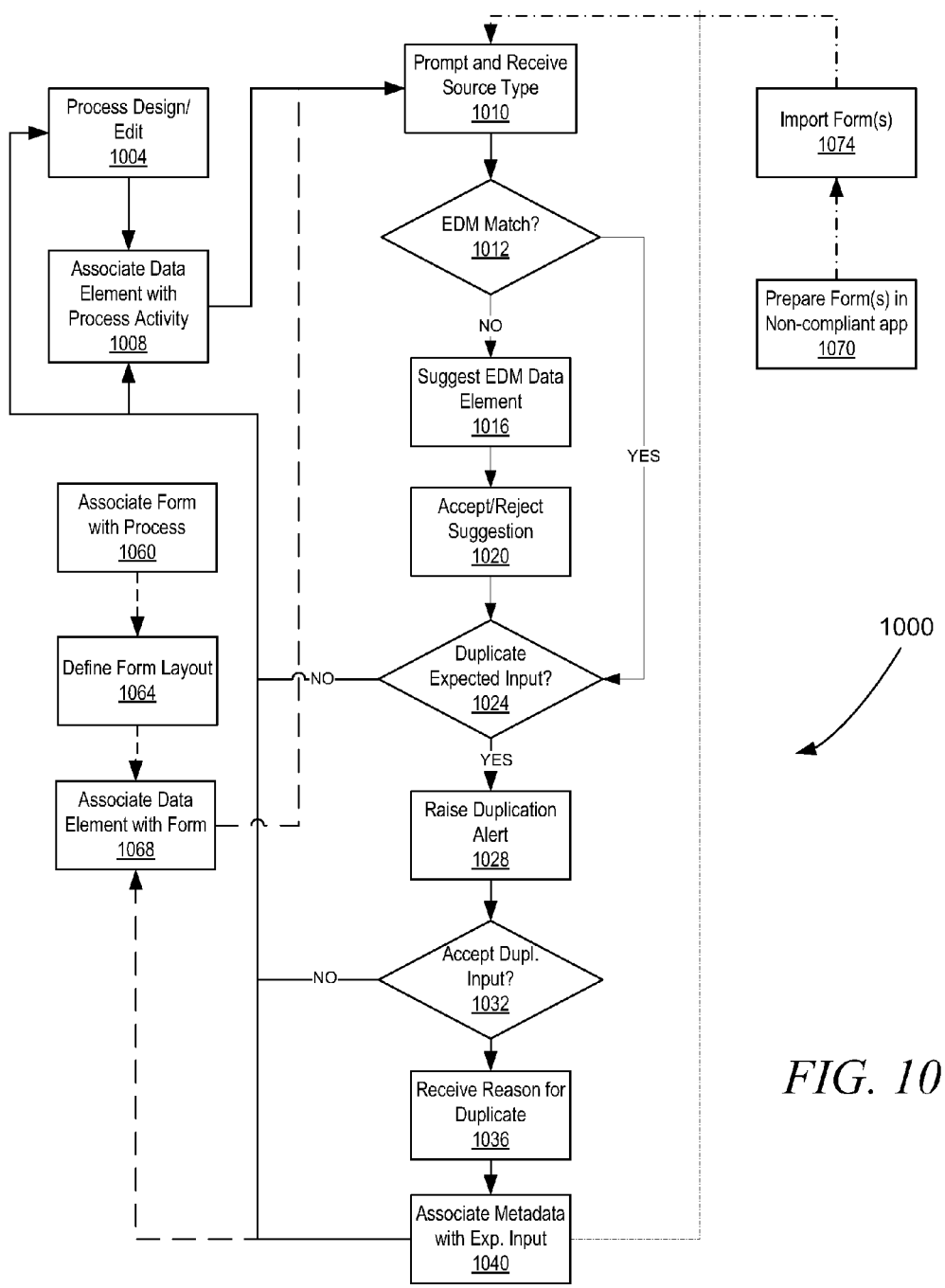
FIG. 10 is a schematic flow chart illustrating a method of detecting wasteful data collection, in accordance with an example embodiment.

A more detailed exemplary method will now be described with reference to FIG. 10, in which flowchart 1000 illustrates a sequence of operations in the method. The example embodiment of FIG. 10 will be described with reference to an enterprise model system 102 of FIGS. 1-3, and with reference to the example process 800 of FIG. 8. First, a user (also referred to herein as a designer or administrator) may design or edit the process 800, at block 1004, by use of the model building/editing module 204.

The building or editing of the process may include associating data elements with respective process activities by use of the input association module 240, at block 1008, to create expected inputs. As used herein, an expected input means an indication of expected collection of a particular data element during execution of the associated process activity. In the present example embodiment, the user may provide a data element identifier 354 (FIG. 3) associated with the respective process activity, for each expected input. For example, expected collection of a customer name (Cust_Name) during provision of customer information, at block 802 (FIG. 8), represents a single expected input. Table 1 below illustrates a list of the expected inputs associated with the process 800 of FIG. 8.

Associating data elements with process activities may also include providing additional information regarding the type of source that provides each expected input. For example, the user may specify, with respect to each expected input, whether the expected input is to be provided by an external entity (identified by the source type identifier 360 "External"), by a person internal to an organization responsible for executing the process ("Internal"), or by a system, such as the ECM 842 or the CRM system 832 ("System"). In the present embodiment, the method 1000 may enforce mandatory provision of a source type with respect to each expected input. To this end, the user may be prompted, at block 1010, to enter the source type of the relevant data element. The prompt generated at block 1010 may include a drop down list from which the user is to select an appropriate source type, in order to proceed.

TABLE 1

| No | Process Activity | Data Element ID | Source Type ID |
|---|---|---|---|
| 1 | Provide Customer Info | Cust_Name | External |
| 2 | Provide Customer Info | Cust_Org | External |
| 3 | Provide Customer Info | Cust_Email | External |
| 4 | Provide Customer Info | Cust_Phone | External |
| 5 | Provide Customer Info | Cust_Address | External |
| 6 | Update Billing System | Cust_Name | System |
| 7 | Update Billing System | Cust_Org | System |
| 8 | Update Billing System | Cust_Email | System |
| 9 | Update Billing System | Cust_Phone | System |
| 10 | Update Billing System | Cust_Address | System |
| 11 | Provide Additional Customer Info | Cust_Phone | External |
| 12 | Provide Additional Customer Info | Cust_Email | External |
| 13 | Provide Additional Customer Info | Cust_Segment | External |
| 14 | Provide Additional Customer Info | Cust_Revenue | External |
| 15 | Create Customer in UW System | Cust_Segment | Internal |
| 16 | Create Customer in UW System | Cust_Name | Internal |
| 17 | Create Customer in UW System | Cust_Email | Internal |
| 18 | Create Customer in UW System | Cust_Phone | Internal |
| 19 | Create Customer in UW System | Cust_Address | Internal |
| 20 | Create Customer in UW System | Cust_Revenue | Internal |
| 21 | Update ECM System | Cust_Revenue | Internal |

Upon association of a particular data element with a process activity, at block 1008, the quality analyzer module 246 automatically analyzes, at block 1012, the particular data elements, with reference to the enterprise data model 370, to assess whether or not the data element identifiers 354 are consistent with the enterprise data model 370. If no exact match to the source type identifier 360 is found in the enterprise data model 370, then the quality analyzer module 246 may perform a phonetic and/or semantic similarity search through the enterprise data model 370, and may suggest to the user, at block 1016, a list of alternative data element identifiers 354 that are already included in the enterprise data model 370. The user may either accept, or reject, at block 1020, the suggested alternative data element identifiers. If the user accepts a suggested alternative data element identifier, the duplication identifier module 220 automatically analyzes the data input information 350 (FIG. 3), at block 1024, based on the accepted data element identifier 354, to determine whether or not the expected input is a duplicate expected input. If a user rejects, at block 1020, the suggested alternative data element identifiers from the enterprise data model 370, or if there is an exact match for the user-entered data element identifier 354, then the operation of identifying duplicate expected inputs, at block 1024, is performed with reference to the user-entered data element identifier 354.

The identification of duplicate expected inputs, at block 1024, comprises determining whether or not the data input information 350 already includes an expected input 352 with respect to the particular data element identifier 354. Thus, for example, if the user first enters the expected inputs with respect to the operation of providing customer information (represented by block 802 in FIG. 8), and thereafter associates the data element relating to a customer telephone number (Cust_Phone) with the operation of providing additional customer information (represented by block 806 in FIG. 8), the duplication identifier module 220 will determine that the data element identifier "Cust_Phone" is already associated with another process activity, and that the expected input 352 which the user is attempting to create is therefore a duplicate expected input. In other words, the data duplication identifier module 220 determines that there is at least one other expected input 352 with respect to a common corresponding data element (Cust_Phone). In some embodiments, a duplicate expected input will only be identified if the respective expected inputs 352 relating to the common data element are associated with different process activities. In other embodiments, duplicate expected inputs may also be identified in instances where a particular data element is associated more than once with the same process activity.

In response to identification of a duplicate expected input 352, at block 1024, the alert generator 242 automatically raises a duplication alert, at block 1028. The user is prompted by the duplication alert to accept or reject the identified duplicate expected input, at block 1032. If the duplicate expected input is rejected, the user may edit or redesign the process, or may select a different data element for association with the relevant process activity, at block 1008. In the example process 800 of FIG. 8, the collection of the data element Cust_E-mail in the provision of additional customer information, at block 806, may be omitted, for example by changing an associated form to remove collection of the customer e-mail therefrom.

If, however, the user accepts the identified duplicate expected input, the duplicate expected input is recorded as part of the data input information 350. However, a duplication acceptance indicator 362 (FIG. 3) is stored in the data input information 350 in association with the duplicate expected input, indicating that the user/designer has accepted duplication of the particular expected input. The raising of duplication alerts, at block 1028, may in some embodiments be limited to identified duplicate expected inputs obtained from an external source.

The user may also be prompted, at block 1036, to provide a reason for duplication of an expected input. In a particular embodiment, the user may be presented in a GUI with a predetermined list of reasons for duplication of expected inputs. Such reasons may include to track changes in the state of data, to validate data from a compliance/risk perspective, that duplication is a requirement from a tracking perspective, and to update existing data. In response to provision of the reason for duplication, at block 1036, a duplication reason indicator 364 reflecting the user input in this regard, together with the duplication acceptance indicator 362 and a source type identifier 360, may be associated, at block 1040, with the newly created expected input 352 as metadata 358 in the data input information 350 of the system 102. The operations represented by blocks 1012 through 1040 may be repeated for each data element associated by the user with a respective process activity.

Instead of, or in addition to, explicit association of individual data elements with respective process activities, at block 1008, the association of particular data elements with process activities, to reflect expected inputs, may be effected through the creation or editing of forms which are associated with process activities. To this end, the forms module 248 provides a functionality whereby a form may be associated with a particular process activity, at block 1060, whereafter form layout and content may be defined, at block 1064, and data elements may be associated with the form, at block 1068. The forms module 248 may provide interactive functionality, so that upon association of a particular data element with the form, data quality analysis may be performed by the quality analyzer module 246 and expected input duplication may be identified by the duplication identifier module 220. The operations represented by blocks 1012 through 1040 in FIG. 10 may thus be repeated for each data element that is associated with one of the process activities, at block 1068.

A further alternative method of creating expected inputs may comprise the preparation of forms in a computer application which is not compliant with the duplication identifier module 220. A user may thus generate forms, at block 1070, in an application such as MS Word™, MS Excel™, or MS Visio™, and may thereafter import such forms, at block 1074, by use of a forms import/conversion module 244. In some embodiments, the forms import/conversion module 244 is configured to permit batch import of a plurality of forms that may have been created in the noncompliant applications. When such a noncompliant form is imported by the system 102 and is converted to be compliant with the logical process model information 310 and data input information 350, operations 1012 through 1040 may be performed with respect to each data element or data element identifier included by the user in the form.

Figure 11:
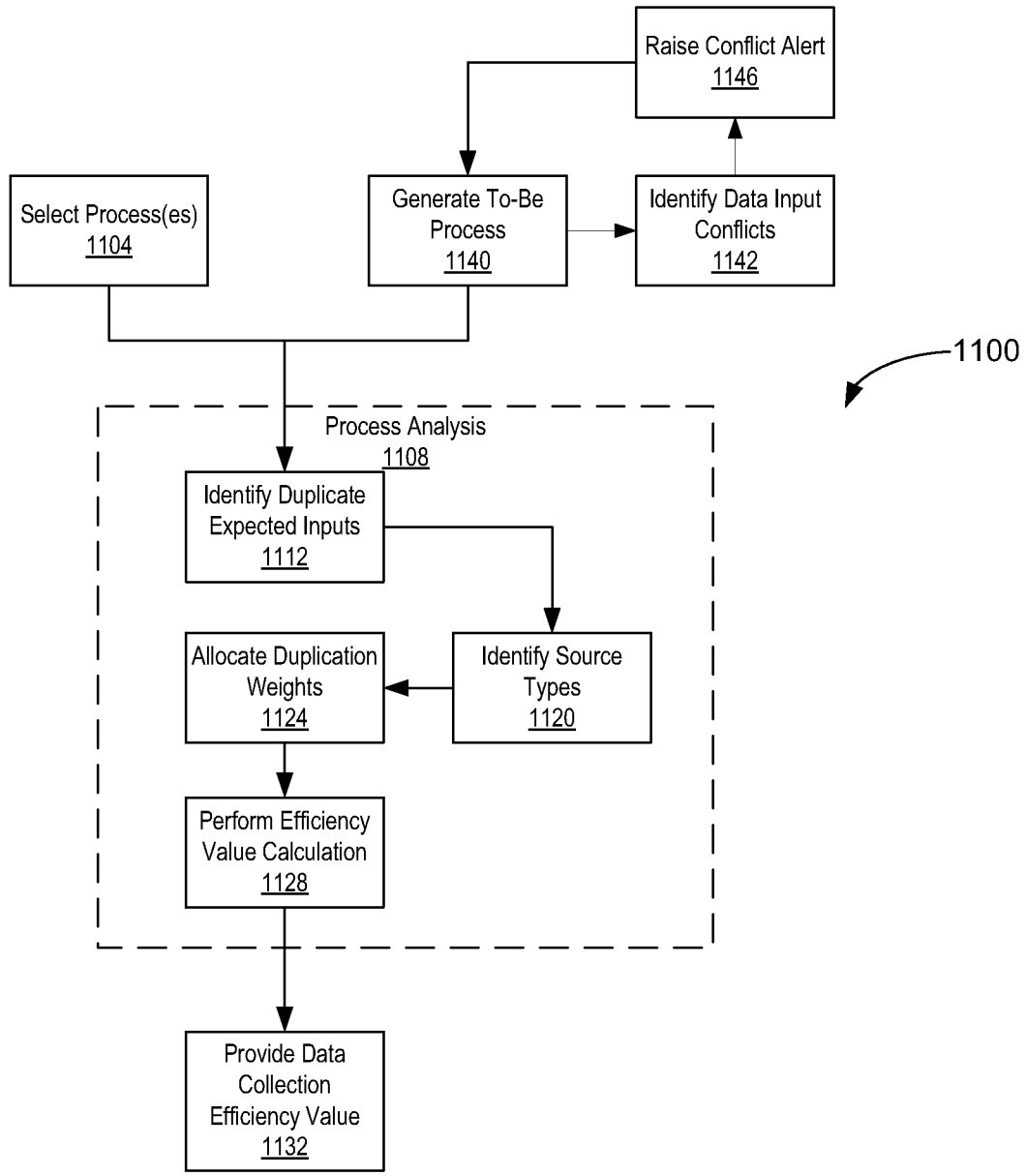
FIG. 11 is a schematic flow chart illustrating a method of analyzing process model information, in accordance with an example embodiment.

In FIG. 11, a flowchart 1100 is shown, representing an exemplary embodiment of a method for analyzing the data input information 350 to assess data collection efficiency of a process or part thereof. First, a user selects, at block 1104, a process or a part of a process for consideration, in order to calculate a data collection efficiency value for the selected process or part thereof. Thereafter, process analysis is performed, at block 1108, by the process model analysis module 208.

The process analysis comprises, at block 1112, identifying duplicate expected inputs forming part of the data input information 350 associated with the selected process. The identification of duplicate expected inputs is effected by the duplication identifier module 220 and is similar or analogous to the operation performed with reference to block 1024 in FIG. 10, as described above. The identification of duplicate expected inputs, at block 1112, with reference to the example process 800 described with reference to FIG. 8 and Table 1, may return results of such as that contained in Table 2 below.

TABLE 2

| Data Element ID | Process Activity | Data Provider | Source Type | System |
|---|---|---|---|---|
| Cust_Email | Provide Customer Info | Customer | External | CRM |
| Cust_Phone | Provide Customer Info | Customer | External | CRM |
| Cust_Phone | Provide Additional Customer Info | Agent | External | CRM |
| Cust_Email | Provide Additional Customer Info | Agent | External | CRM |
| Cust_Revenue | Provide Additional Customer Info | Agent | External | CRM |
| Cust_Revenue | Update ECM System | CSR | Internal | ECM |

The process analysis 1108 may further include, at block 1120, identifying a source type for each duplicate expected input, based, for example, on the associated source type identifiers 360. Duplication weights may thereafter be allocated to each of the identified expected duplicate inputs, at block 1124. In an example embodiment, a relatively high duplication weight may be allocated to all duplicate expected inputs that are provided by entities external to the process system 102. Duplicate inputs that are received from, for example, customers and external organizations may therefore be provided with a relatively high duplication weight. It will be appreciated in this regard that more severe data quality issues may be caused by inaccurate or inconsistent data input, and that the likelihood of such inaccurate or inconsistent data input being received from external entities is greater than the likelihood of inaccurate data inputs being provided by internal entities. Additionally, duplicate inputs required from external agents may be frustrating to such entities, and unnecessary input duplication may result in reduced custom or agent satisfaction and increased business impact. A medium weight may be applied to duplicate expected inputs, which are provided by an internal entity, such as employees or agents of a company or organization executing the process 800. The internal entities to which a medium duplication weight may be applied are human actors or internal organizations, as opposed to computer systems or applications. Expected duplicate inputs that are provided by internal applications or computer systems may be provided a lowest duplication weight. In the present example embodiment, expected duplicate inputs from an external source maybe allocated a weight value of 3, while expected duplicate inputs from internal sources may be allocated a weight value of 2, and expected duplicate inputs from computer applications or systems may be allocated a weight value of 1. Table 3 shows application of the above-described weightage method to the example process of FIG. 8.

Following the allocation of duplication weights, at block 1124, an efficiency value calculation may be performed, at block 1128. In the present example embodiment, the efficiency value calculation comprises division by the total number of data elements that are to be collected in the analyzed process 800 of the cumulative duplication weight values for the processor 800. In other words, the allocated duplication weights for the duplicate expected inputs are summed, and the cumulative value of duplication weights is thereafter divided by the count of data elements that are to be collected in the process 800. With reference to Table 3, it will be seen in that the total of allocated duplication weight values for the process 800 is 8, while the number of data elements to be collected in the process is 7 (as can be seen with reference to Table 1, which includes 7 unique data element identifiers). The efficiency value calculation, at block 1128, will therefore, with reference to the example process of FIG. 8, return a data collection efficiency value of 1.14, which may be outputted on a graphical user interface, at block 1132. It will be appreciated that a higher data collection efficiency value indicates lower data collection efficiency or more wasteful data collection, while a data collection efficiency value of 0 would indicate no inefficiency in data collection.

TABLE 3

| Data | Source | Source Type | Duplicate Count | Weight/ Duplicate | Duplication Weight |
|---|---|---|---|---|---|
| Cust_Phone | Agent | External | 1 | 3 | 3 |
| Cust_Email | Agent | External | 1 | 3 | 3 |
| Cust_Revenue | CSR | Internal | 1 | 2 | 2 |
| Total | | | | | 8 |

The calculation of a data collection quality ratio or data collection efficiency value as described above may be used to provide an indication of the data collection efficiency of a process in isolation and/or may be used for comparing the data collection deficiencies of two or more processes. The process analysis 1108 may, for example, be used to compare the data collection efficiency of an as-is process with a to-be process, in order to assess the effect of possible changes to a process on the data collection efficiency of the process. A user may thus, at block 1140, generate a to-be process after having obtained a data collection efficiency value for a process in its current form. The generation of the to-be process may typically comprise the addition, operation, or deletion of process activities, a change in the sequence of process activities, and/or the combination of two or more existing processes. Data input conflicts in the to-be process may automatically be identified, at block 1142, and may be brought to the attention of the user by the raising of a conflict alert, at block 1146. The process model analysis module 208 may thus, for example, identify when the original collection of a particular data element is omitted. Process redesign may, for example, inadvertently omit a process activity in which a particular data element is originally collected, which would negatively affect downstream processes that consume that particular data element. A user may, in response to such a conflict alert, reinstate the omitted process activity, or may include collection of the particular data element in another process activity.

In addition to automatic identification of data element conflicts, the process model analysis module 208 may identify a list of data elements that may be affected by a particular change in the process or in a form associated with the process. The user may thus indicate a particular change and may request a list of data elements affected by the change. Such analysis may also be performed in order to identify a list of systems and databases utilizing potentially conflicting data, and may analyze the impact of a change to the process and/or forms in this regard. For example, if a user contemplates the removal from the process 800 of FIG. 8 of collection by the agent 834 of the data element Cust_Email, then the process model analysis module 208 may provide the user with a list of system elements and forms that use that data element.

The process model analysis module 208 may also be utilized to facilitate process optimization, by analyzing and reporting to a user details regarding the use by the process and process elements of particular data elements. A user may, for example, select the data element or data field Cust_Email for analysis with respect to the processor 800 of FIG. 8. In response to such a request, the process model analysis module

208 may provide the following information for the data field Cust_Email:

"Cust_Email"
1. Input into CRM system 1 time.
2. Output by CRM system 2 times.
3. Referenced by billing system 1 time.
4. Input by external user 2 times.

This information may be used to redesign or edit the process in order to improve data collection efficiency.

In another embodiment, the data input information 350 may be analyzed to determine a significant or critical source (or so-called golden source) for a particular data element, and a conflict alert may be raised if collection of a data element from its critical source is deleted or omitted in the to-be process. Instead, or in addition, the method may include analyzing the data input information 350 to assess or determine the importance of respective data elements that are to be collected in execution of the process. The importance of a particular data element may be determined based on the number of times the particular data element forms part of an expected input, based on the user-providing a reason for expected input duplication, and/or based on the source type of respective duplicate expected inputs with respect to the particular data element. In this regard, greater repetition of collection of a particular data element tends to indicate greater importance of that data element. A conflict alert may be raised, at block 1146, if a unique expected input from a particular source is, for example, deleted or removed in generation of the to-be process, at block 1140.

The above described method of detecting wasteful data collection may be of particular use in the combination of existing processes, for example in the instance of the merger of two corporate entities. In such cases, repetitive collection of data elements in extensive combined processes may be difficult to detect and/or streamline. The above-described example embodiment, however, facilitates efficient data collection in such processes initially by automatically detecting duplicate expected inputs during process design/editing, and secondly by providing the functionality for calculating a data collection efficiency value for one or more processes. A method is thereby provided to define the relationship of data elements with processes forming part of an enterprise process model, and may link the data elements to an enterprise data model, to facilitate the identification of wasteful data collection.

An enterprise data model may also automatically be generated in instances where an enterprise does not yet have an enterprise data model. In such cases, an enterprise data model may automatically be generated upon the association of data elements with respective process activities, whereafter consistency with the previously entered data elements may be enforced, as described above.

Figure 12:
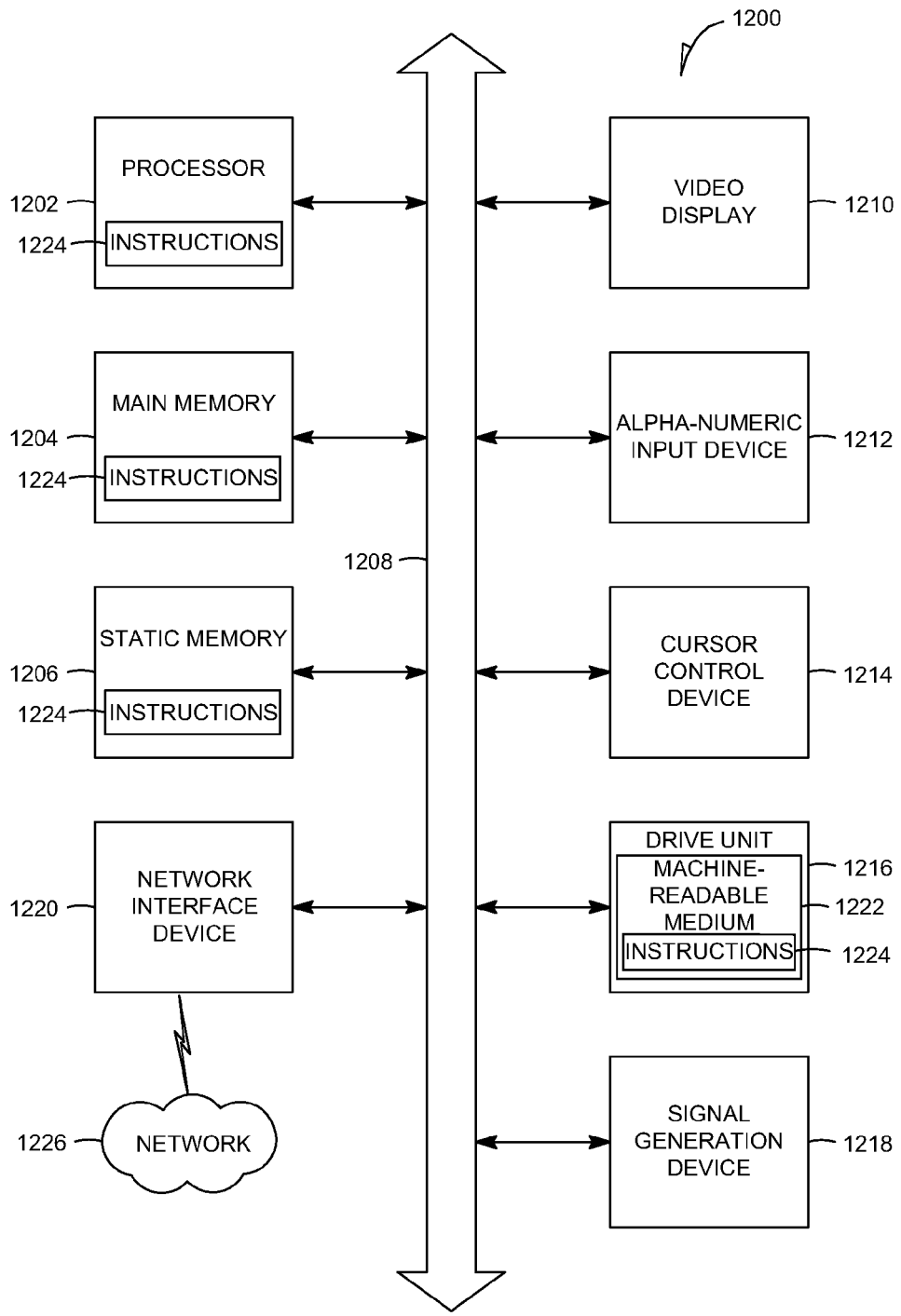
FIG. 12 is a diagrammatic representation of a machine in the example form of a computer system within which a set of instructions for causing the machine to perform any one or more of the methodologies discussed herein may be executed.

FIG. 12 shows a diagrammatic representation of machine in the example form of a computer system 1200 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1200 includes a processor 1202 (e.g., a central processing unit (CPU) a graphics processing unit (GPU) or both), a main memory 1204 and a static memory 1206, which communicate with each other via a bus 1208. The computer system 1200 may further include a video display unit 1210 (e.g., a liquid crystal display (LCD) or a cathode ray tube (CRT)). The computer system 1200 also includes an alphanumeric input device 1212 (e.g., a keyboard), a cursor control device 1214 (e.g., a mouse), a disk drive unit 1216, a signal generation device 1218 (e.g., a speaker) and a network interface device 1220.

The disk drive unit 1216 includes a machine-readable medium 1222 on which is stored one or more sets of instructions (e.g., software 1224) embodying any one or more of the methodologies or functions described herein. The software 1224 may also reside, completely or at least partially, within the main memory 1204 and/or within the processor 1202 during execution thereof by the computer system 1200, the main memory 1204 and the processor 1202 also constituting machine-readable media.

The software 1224 may further be transmitted or received over a network 1226 via the network interface device 1220.

While the machine-readable medium 1222 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies described herein. The term "machine-readable medium" shall accordingly be taken to include, but not be limited to, solid-state memories, optical and magnetic media, and carrier wave signals.

Thus, a method and system to perform an analysis of a process supported by a process system have been described. Although the methods and systems described herein have been exemplified with reference to specific example embodiments, it will be evident that various modifications and changes may be made to these embodiments without departing from the broader spirit and scope of method and/or system. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system for detecting wasteful data collection comprising:
   at least one memory that stores:
      logical process model information comprising:
         a plurality of process activities in a business process, and
         definitions of logical relationships between respective process activities, including definition of one or more sequences in which at least some of the respective process activities are to be performed, and data input information comprising:
         a plurality of data element identifiers indicative of a plurality of expected inputs, each expected input comprising an expected collection of a corresponding case-specific data element during performance of respective cases of the business process,
         a plurality of process activity identifiers associated with respective data element identifiers, each process activity identifier linking a respective data element identifier to a particular process activity in which the corresponding case-specific data element is to be collected; and
         a source type identifier associated with each data element identifier to indicate a particular type of a predefined plurality of types of sources from which an associated expected input is to be received; and
      a computer including:
         a duplication identifier module to analyze the data input information to automatically identify duplicate expected inputs, each duplicate expected input being one of the plurality of expected inputs for which there is at least one other expected input having a corresponding common data element, the duplicate expected input and the at least one other expected input being linked to different process activities of the plurality of process activities of the business process; and
         an efficiency calculation module configured to calculate a data collection efficiency value based at least in part on the identified duplicate expected inputs, and to allocate a duplication weight to each duplicate expected input corresponding to the associated source type identifier.

2. The system of claim 1, wherein the data input information further comprises a duplication acceptance indicator associated with at least one duplicate expected input to indicate that the at least one duplicate expected input is user-accepted, the efficiency calculation module configured to regard the user-accepted duplicate expected input as a non-duplicate expected input in calculation of the data collection efficiency value.

3. The system of claim 1, wherein the data input information further comprises, associated with each user-accepted duplicate expected input, metadata regarding a user-provided reason for user-accepted duplicate expected inputs.

4. The system of claim 1, further comprising an input association module to permit user creation of expected inputs and to enable selective association by a user of the plurality of expected inputs with the plurality of process activities forming part of the logical process model information.

5. The system of claim 4, wherein the input association module includes an alert generator to automatically generate a duplication alert in response to identification of at least one of the duplicate expected inputs, the duplication alert being generated upon association by the user of a particular duplicate expected input with one of the process activities.

6. The system of claim 5, wherein the duplication alert is to at least prompt the user to accept the particular duplicate expected input, or to prompt the user to provide a reason for the particular duplicate expected input.

7. The system of claim 4, wherein the input association module comprises a forms module to permit user-association of a particular expected input with a form that is to be completed during execution of the business process, the forms module further permitting user-association of the form with a selected process activity.

8. A method for detecting wasteful data collection comprising:
   associating a plurality of expected inputs with respective process activities of a logical process model comprising a logically structured series of process activities in a business process to be performed by a process system, to provide definitions of logical relationships between the respective process activities, including definition of one or more sequences in which at least some of the respective process activities are to be performed, and data input information comprising:
      a plurality of data element identifiers indicative of a plurality of expected inputs, each expected input comprising an expected collection of a corresponding case-specific data element during performance of respective cases of the business process,
      a plurality of process activity identifiers associated with respective data element identifiers, each process activity identifier linking a respective data element identifier to a particular process activity in which the corresponding case-specific data element is to be collected; and
      a source type identifier associated with each data element identifier to indicate a particular type of a predefined plurality of types of sources from which an associated expected input is to be received; and
   using one or more processors:
      analyzing expected inputs associated with two or more of the process activities, to automatically identify duplicate expected inputs associated with the logical process model, each duplicate expected input being one of the plurality of expected inputs for which there is at least one other expected input having a corresponding common data element, the duplicate expected input and the at least one other expected input being linked to different process activities of the logically structured series of process activities of the business process; and
      calculating a data collection efficiency value based at least in part on the identified duplicate expected inputs, and to allocate a duplication weight to each duplicate expected input corresponding to the associated source type identifier.

9. The method of claim 8, further comprising identifying user-accepted duplicate expected inputs, the calculation of the data collection efficiency value comprising regarding the user-accepted duplicate expected inputs as non-duplicate expected inputs.

10. The method of claim 8, further comprising associating with each user-accepted duplicate input metadata regarding a user-provided reason for user-accepted expected input duplication.

11. The method of claim 8, further comprising automatically generating a duplication alert in response to identification of at least one of the expected input duplication, the duplication alert being generated upon association by a user of a particular duplicate expected input with one of the process activities during an operation of mapping expected inputs to the process activities.

12. The method of claim 11, wherein generating the duplication alert includes at least prompting a user to accept the particular duplicate expected input, or prompting the user to provide a reason for the particular duplicate expected input.

13. The method of claim 8, wherein associating a particular expected input with a selected process activity comprises associating the particular expected input with a form that is to be completed during execution of the process, and associating the form with the selected process activity.

14. A non-transitory machine-readable storage medium storing instructions for detecting wasteful data collection which, when performed by a machine, cause the machine to:
associate a plurality of expected inputs with respective process activities of a logical process model comprising a logically structured series of process activities in a business process to be performed by a process system, to provide definitions of logical relationships between the respective process activities, including definition of one or more sequences in which at least some of the respective process activities are to be performed, and data input information comprising:
   a plurality of data element identifiers indicative of a plurality of expected inputs, each expected input comprising an expected collection of a corresponding case-specific data element during performance of respective cases of the business process,
   a plurality of process activity identifiers associated with respective data element identifiers, each process activity identifier linking a respective data element identifier to a particular process activity in which the corresponding case-specific data element is to be collected; and
   a source type identifier associated with each data element identifier to indicate a particular type of a predefined plurality of types of sources from which an associated expected input is to be received;
analyze expected inputs associated with two or more of the process activities, to automatically identify duplicate expected inputs associated with the logical process model, each duplicate expected input being one of the plurality of expected inputs for which there is at least one other expected input having a corresponding common data element, the duplicate expected input and the at least one other expected input being linked to different process activities of the logically structured series of process activities of the business process; and
calculate a data collection efficiency value based at least in part on the identified duplicate expected inputs, and to allocate a duplication weight to each duplicate expected input corresponding to the associated source type identifier.

* * * * *